United States Patent
Schusser

(10) Patent No.: US 8,761,959 B2
(45) Date of Patent: Jun. 24, 2014

(54) DIRECTIONAL POINTERS FOR VEHICLE CONTROL UNIT ACTUATION SEQUENCE

(75) Inventor: Peter Schusser, Mammendorf (DE)

(73) Assignee: Bayerische Motoren Aktiengesellschaft, Munich (DE)

( * ) Notice: Subject to any disclaimer, the term of this patent is extended or adjusted under 35 U.S.C. 154(b) by 196 days.

(21) Appl. No.: 13/208,214

(22) Filed: Aug. 11, 2011

(65) Prior Publication Data

US 2012/0041616 A1 Feb. 16, 2012

(30) Foreign Application Priority Data

Aug. 12, 2010 (DE) .................. 10 2010 039 239

(51) Int. Cl.
*G06F 17/00* (2006.01)

(52) U.S. Cl.
USPC .................................. 701/1; 701/36

(58) Field of Classification Search
None
See application file for complete search history.

(56) References Cited

U.S. PATENT DOCUMENTS

| 6,009,355 | A * | 12/1999 | Obradovich et al. | 701/1 |
|---|---|---|---|---|
| 2001/0052912 | A1* | 12/2001 | Ishii et al. | 345/835 |
| 2005/0135112 | A1* | 6/2005 | Olkay et al. | 362/551 |
| 2006/0215414 | A1* | 9/2006 | Lauber | 362/511 |
| 2008/0278298 | A1* | 11/2008 | Waeller et al. | 340/425.5 |
| 2009/0058680 | A1* | 3/2009 | Benn | 340/908.1 |
| 2010/0070932 | A1* | 3/2010 | Hur | 715/863 |
| 2011/0260887 | A1* | 10/2011 | Toledo et al. | 340/932.2 |

OTHER PUBLICATIONS

Slimjim25c, Goldeneye 007 Map—Golden Gun Area, Aug. 8, 2002.*
Wesner-Early, Caryn, EIC STIC search, Jan. 16, 2014.*

* cited by examiner

*Primary Examiner* — Fadey Jabr
*Assistant Examiner* — Krishnan Ramesh
(74) *Attorney, Agent, or Firm* — Crowell & Moring LLP

(57) ABSTRACT

A motor vehicle, is provided with a plurality of operator control units which can be operated individually by an occupant in order to initiate functions of the motor vehicle, a plurality of display units that can be illuminated, and a display control logic unit. In response to operator activation of a first function associated with a second function in a specified operating sequence, a first display unit can be controlled in such a way that the first display unit displays a directional pointer in the spatial direction of a second operator control unit, which on being actuated can initiate the second function.

10 Claims, No Drawings

DIRECTIONAL POINTERS FOR VEHICLE CONTROL UNIT ACTUATION SEQUENCE

CROSS-REFERENCE TO RELATED APPLICATION

This application claims priority under 35 U.S.C. §119 from German Patent Application No. DE 10 2010 039 239.1, filed Aug. 12, 2010, the entire disclosures of which are herein expressly incorporated by reference.

BACKGROUND AND SUMMARY OF THE INVENTION

The invention relates to a motor vehicle, having a plurality of operator control units, which can be operated individually by hand by an occupant of the motor vehicle, in order to be able to initiate certain functions of the motor vehicle in the event of an operator input, and having a plurality of display units that can be illuminated.

Modern motor vehicles usually have a plurality of display and operator control units or rather display and control panels. Usually the operating state, in which the display and operator control units or rather the display and control panels can be operated, is not clear. Similarly the availability of the motor vehicle functions that can be initiated by the display and control units is usually either not discernible at all in the modern display and operator control concepts or these functions are only indicated, for example, by a random activation of displays or illumination of pushbuttons.

In particular, in motor vehicles, but basically also in other devices, for example, in modern household appliances, the existing display and control panels cannot be operated in every operating state. However, this is not always recognized by the user, especially when the availability of one or more functions changes during an operating sequence. One example from the motor vehicle environment: after unlocking the door, the interior light automatically switches on. However, most of the other functions of the motor vehicle are not operator accessible in this operating state. Then the motor vehicle is activated by the user by means of a central switch (in particular, the ignition lock). This switch can lead to a variety of operating states (engine on=readiness to drive, "ignition on", entertainment mode . . . ). Then, depending on the operating state, a variety of different motor vehicle functions that were not available before are available.

In motor vehicles the activation of the search light or displays usually takes place without allowing one to draw inferences as to the operating sequences.

The object of the present invention is to improve the assistance offered to a user or more specifically an occupant in operating the functions of the motor vehicle.

The interior of a motor vehicle according to the invention has, on the one hand, a plurality of operator control units (for example, switches, keys, levers, rotary knobs and pushbuttons, etc.), which can be operated manually by an occupant of the motor vehicle, in order to initiate certain functions of the motor vehicle in the event of an operator input. However, it is also possible, depending on the operating mode and context of different functions, to actuate one and the same operating control unit. On the other hand, the interior of the motor vehicle according to the invention has a plurality of display units that can be illuminated. Furthermore, the motor vehicle according to the invention has a display control logic unit. With this display control logic unit at least one first function of the motor vehicle can be assigned at least one second function of the motor vehicle by a specified operating sequence. In the simplest case such an operating sequence may comprise two functions, for which it is necessary or at least advisable to operate one after the other. For example, an operating sequence may consist of the sequence "start engine", "select gear". However, an operating sequence may also comprise three or more functions, for example, "adjust seat position", "adjust rearview mirror", "adjust outside mirror". In this context a first display unit can be controlled by the display control logic unit in such a way that in response to the initiation of the first function (due to actuation of a first operator control unit) said display unit displays a directional pointer, which is visually perceivable by the occupant, in the spatial direction of a second operator control unit, which on being actuated can initiate then the second function.

Therefore, after the occupant has manually actuated the first operator control unit and, as a result, has initiated the first function, the displayed visual directional pointer points the occupant in the direction of the second operator control unit. Consequently the occupant is led in an easy-to-understand way through the sequence of operations defined as the operating sequence, which provides that after initiating the first function, the second function should also be initiated. The result is the total sequence: actuating the first operator control unit, directional pointer to the second operator control unit by the first display unit, actuating the second operator control unit.

The display control logic unit can be implemented as the control unit of the motor vehicle or more specifically as the program executed thereon or as a portion of such a program. The at least one specified operating sequence can be saved in the form of a table in a memory unit of the display control logic unit.

Furthermore, a specified operating sequence comprises preferably an assignment of operator control units and/or direction pointing display units to the functions involved in the sequence. Such an assignment can indicate, in particular, which display unit can give the appropriate directional pointer.

Furthermore, a specified operating sequence comprises preferably information about a certain way of actuating the display unit(s). Such information can indicate, in particular, the type of directional pointer that should be displayed for the present operating sequence. Such information can be especially helpful when a display unit can display different types of directional pointers.

Furthermore, a preferred embodiment of the invention provides that the display control logic unit can assign to the second function at least one third function by the operating sequence; and in response to the initiation (occurs by actuating the second operator control unit) of the second function, a second display unit can be controlled by the display control logic unit in such a way that said second display unit displays a directional pointer, which is visually perceivable by the occupant, in the spatial direction of a third operator control unit, which on being actuated can initiate the third function.

Therefore, in this preferred embodiment of the invention, after the occupant has manually actuated the second operator control unit and, as a result, has initiated the second function, the additional visual directional pointer—displayed now by the second display unit—points the occupant in the direction of the third operator control unit. Consequently the occupant is led in an easy-to-understand way through a sequence of operations having a specified multi-stepped (three steps in this case) operating sequence. The result is the total sequence: actuating the first operator control unit, directional pointer to the second operator control unit by the first display unit, actuating the second operator control unit, directional pointer to the third operator control unit by the second display unit, actuating the third operator control unit. It is self-evident that in the spirit of the invention this concept can be continued with additional directional pointers (displayed by additional or, if desired, even the same display units) to additional operator control units.

Preferably the first display unit is disposed in essence spatially between the first and the second operator control unit and preferably lends itself well to displaying a light object having a variable length. If, in addition, said first display unit is disposed in the interior of the motor vehicle in such a way that its length extends in essence parallel to an imaginary connecting line between the first and the second operator control unit, then the visually perceptible directional pointer of the first display unit can consist advantageously of an increase in the length of the light object that is observable by the occupant. If the light object is configured as a light bar, then the visually perceptible directional pointer of the first display unit can consist advantageously of an increase in the length of the light bar that is observable by the occupant. Then the light object or more specifically the light bar traces with increasing length to some extent the connecting line (at first only imaginary). The connecting line can be straight or curved. In particular, it can be made up of several straight pieces with the connections of the straight pieces being preferably rounded off. Such a rounding off has the effect of making the "light flux", which is shown by the increase in length along the connecting line, appear softer, so that it is easier for the eye of the observer to follow.

In particular, a unilateral increase in the length of the light object or more specifically bar on the side of the second operator control unit appears to be advantageous. Therefore, the result of such an increase in length is that the growing end of the object or rather bar moves closer to the operator control unit, to which the pointer points. The observer understands this intuitively as the "pointer movement".

The aforesaid applies especially when the increase in length is essentially continuous. This perception is reinforced even more when the increase in length occurs at an essentially uniform rate.

Initial internal tests with the invention reveal that the pointer character is very easily understood intuitively when the increase in length extends over a total duration of more than 300 milliseconds. An additional enhancement of the pointer effect can be observed when the increase in length extends over a total duration of more than 600 milliseconds.

After the light object or more specifically the light bar has reached its maximum length, it can in essence be reset to its minimum length, in order to allow the length to grow multiple times in succession in essentially the same way. This type of pointer can be interrupted after a defined period of time or after a number of repetitions, or after actuating the operator control unit, to which the pointer is pointing (or after initiating the function that was initiated thereby). In this case the start of a growth process can be carried out to completion, if desired, up to the maximum length, in order to prevent the user from becoming irritated.

According to an especially advantageous embodiment of the invention, the first display unit is configured essentially as an optical waveguide, the resulting depicted light object is configured essentially as a light bar, and the light bar has a total length of more than 15 centimeters. Such a large spatial expansion makes it possible to bridge even greater distances in the motor vehicle interior (for example, between the engine start/stop button and the gear selector lever or also between the adjusting elements for interior and exterior mirrors) without a logic break in the perception of the occupant who is watching.

The invention is based, in particular, on the following described idea.

The display and operator control elements of a motor vehicle are linked together by means of graphics displays that can be activated (one possible solution is an optical waveguide). The elements that have to be or can be operated in succession in a logical and/or chronological sequence of operations are connected together.

If, for example, a start/stop button of the motor vehicle is operated, then thereafter a graphics element is activated, and this graphics element draws the attention of the occupant to the gear selector lever. Having selected the gear, the occupant is pointed in a suitable manner to other motor vehicle operator control elements that have to be operated at this point, or rather their functions have become available. The pointer can be, for example, an optical waveguide-based display element that "connects" the operator control elements that are to be operated in succession.

In order to show the operator optimally linked operating sequences, the optical waveguide in such an embodiment of the invention is not only switched on, but a "light flux" from the initially operated element to the operating element(s) that are then available and/or operator accessible is also generated or rather activated.

This light flux can occur once or repeatedly until the customer has completed the next step of the operating process that is either necessary or advisable for the sequence of operations.

The visual phenomenon of the light flux can be accentuated in such a way that the front of the light appears to flow from one element to the next. That is, the optical waveguide is illuminated at one end and then gradually or rather piece by piece the graphics link is illuminated until the entire link glows.

One possible technical solution to this end is the use of an optical waveguide and a plurality of light sources. The light sources are actuated individually, and the light is transmitted into the optical waveguide by means of appropriate coupling geometries. Then the described effect is attained by switching on, dimming and switching off the light sources.

In summary the invention can help to enhance the comprehensibility of the display and control concept of a motor vehicle. The occupant, in particular the driver, is shown the successive operating steps and the availability of functions. In addition, a highly sophisticated and stylish impression can be made with the use of the described visual appearance of a "flowing" light.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A motor vehicle, comprising:
 a plurality of operator control units configured to be operated individually by hand by an occupant of the motor vehicle to initiate functions of the motor vehicle;
 a plurality of spatial direction indication display units located at a plurality of physical locations within an occupant space of the motor vehicle, the display units being configured to be illuminated to provide spatial direction indications between operator control units within the occupant space of the motor vehicle; and a display control logic unit, wherein the display control logic unit is configured to, in response to operation of a first one of the plurality of operator control units by the operator to initiate the first function, to cause a first one of the plurality of display units to display a directional pointer from the first one of the plurality of operator control units in the spatial direction of a second one of the plurality of operator control units configured to initiate a second function associated with the first function in a predetermined operating sequence.

2. The motor vehicle as claimed in claim 1, wherein the display control logic unit is configured to, in response to operation of the second one of the plurality of operator control units by the operator to initiate the second function, to cause at least one of the first one of the plurality of display units and a second one of the plurality of display units to display a directional pointer in the spatial direction of a third one of the plurality of operator control units configured to initiate a third function associated with the second function in the predetermined operating sequence.

3. The motor vehicle as claimed in claim 1, wherein the first one of the plurality of display units is disposed spatially between the first and the second ones of the plurality of operator control units, the first one of the plurality of display units is configured to display a light object having a variable length, a length of the first one of the plurality of display units extends approximately parallel to a line between the first and the second ones of the plurality of operator control units, and the directional pointer of the first one of the plurality of display units is an increase in a length of the light object over time.

4. The motor vehicle as claimed in claim 3, wherein the directional pointer of the first one of the plurality of display units is a unilateral increase in the length of the light object toward the second one of the operator control units.

5. The motor vehicle as claimed in claim 3, wherein the increase in length is a continuous increase.

6. The motor vehicle as claimed in claim 3, wherein the increase in length occurs at a uniform rate.

7. The motor vehicle as claimed in claim 3, wherein the increase in length extends over a duration of more than 300 milliseconds.

8. The motor vehicle as claimed in claim 3, wherein the increase in length extends over a duration of more than 600 milliseconds.

9. The motor vehicle as claimed in claim 3, wherein after the light object has reached a maximum length, the light object is reset to a minimum length, and the increase in length repeats multiple times.

10. The motor vehicle as claimed in claim 3, wherein the first one of the plurality of display units is configured as an optical waveguide, and the light object is configured as a light bar having a length of more than 15 centimeters.

* * * * *